Oct. 9, 1962　　　C. W. DOREMUS　　　3,057,024
ANCHORING MEANS
Filed Oct. 13, 1958
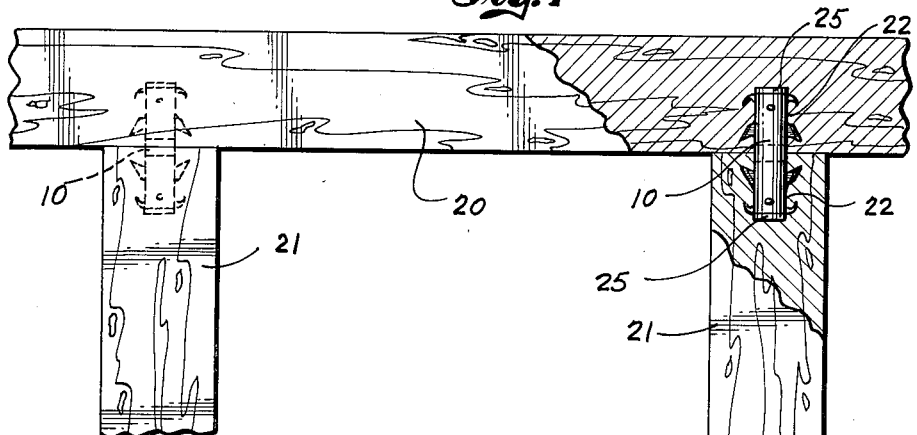
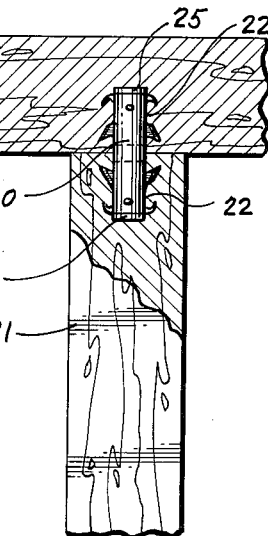
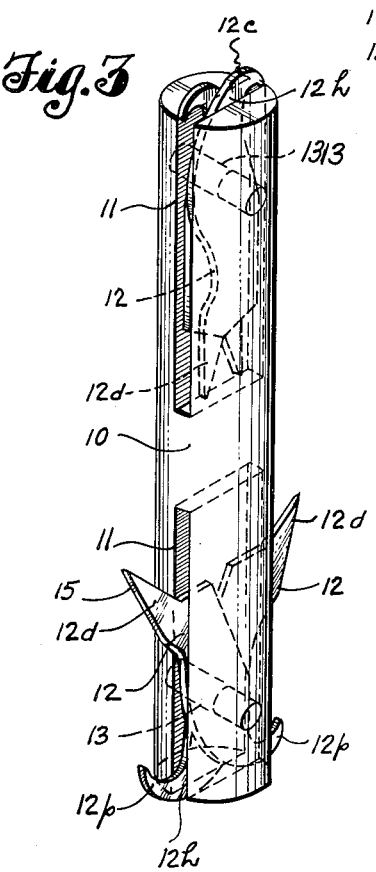
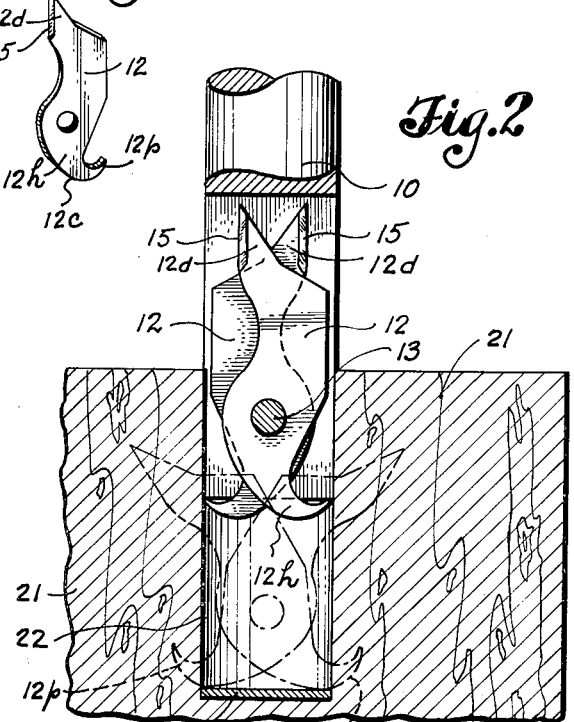
INVENTOR.
CHARLES W. DOREMUS
BY
Robinson & Berry
ATTORNEYS United States Patent Office 3,057,024
Patented Oct. 9, 1962

3,057,024
ANCHORING MEANS
Charles W. Doremus, 11437 20th S., Seattle 88, Wash.
Filed Oct. 13, 1958, Ser. No. 766,881
2 Claims. (Cl. 20—92)

This invention relates to anchors or connectors, and has reference more particularly to an anchor adapted for the securing of one wooden member to, within or upon another.

More specifically stated, the present invention has to do with improvements in connectors which are metal tenon forming members, adapted to be applied to sockets provided in assembled wooden parts or structural members as a means for anchoring them in their joined relationship.

It is the principal object of this invention to provide an anchor of the character above stated, which is in the form of a short, cylindrical metal bar and so designed that its opposite end portions may be fitted in sockets provided to receive them in the pieces of material to be joined, and which metal bar is equipped, within one or both end portions with anchoring dogs that will be actuated from within the bar into extended holding contact with the socketed members receiving the bar upon driving the assembled parts together.

Yet another object of the invention is to provide an anchor of the character and for the purpose above stated, wherein the anchoring dogs are of lever form and each is pivoted in the bar between its ends, with one end arranged to have camming contact with the bottom of the socket upon driving the parts together, thus to rock the lever on its pivotal mounting and actuate its opposite end portions into holding contact with the sidewall of the socket and thus to retain the anchor member against rotative or longitudinal movement in the socket.

It is a further object to provide the bar with locking dogs in paired relationship at its opposite ends, and to so mount them that they will each effect a holding connection at opposite ends with opposite sides of the socket.

Still further objects and advantages of the invention reside in the details of construction of the various parts; in their combination with each other and in the mode of application and use of the anchor, as will hereinafter be fully described.

In accomplishing the above mentioned and other objects of the invention, I have provided the improved details of construction the preferred forms of which are illustrated in the accompanying drawings, wherein:

FIG. 1 is a view showing, in elevation, the manner of securing a wooden beam, or the like, upon posts or columns by anchoring devices embodied by the present invention; parts of one of the posts and beam being broken away for better understanding of the application and use of the anchor.

FIG. 2 is a sectional view of the lower end portion of an anchor embodied by this invention as applied within a socket but before the anchoring dogs which it contains have been actuated to their extended, functional positions.

FIG. 3 is a perspective view of the present form of anchor, as equipped in each of its ends with anchoring dogs; the lower set of dogs being shown in their "holding" positions.

FIG. 4 is a perspective view of one of the locking dogs.

It will here be explained that the present metal bar which forms the anchoring device generally would be equipped at both ends with the paired, locking or securing dogs presently to be described. However, there may be instances of use of such an anchor when it is required or desired that they be provided only in one end. Therefore, it is to be understood that, while the device has herein been illustrated and will be described as having paired anchoring dogs in both ends, it is not intended to so restrict it.

Referring more in detail to the drawings:

The present anchor comprises a length of metal bar 10, for example, a bar of steel one inch in diameter and from four to six inches long. This bar, when applied in use, as an anchoring tenon. The bar is formed in each of its opposite end portions, diametrically therethrough and extending therealong a substantial distance, with slots 11—11. For example, the slots in a bar six or more inches long, may be from two to two and one-half inches long. The opposite end surfaces of the bar are flat and at right angles to the axis of the bar, as has been shown in the several views.

Disposed within each of the slots 11 is a pair of locking or anchoring dogs 12—12. Each dog is formed by a flat piece of suitable metal, preferably steel, to the shape shown in FIG. 2. Paired dogs are placed flatly together and faced in opposite directions. Then they are pivotally fixed in the bar slots by pivot pins 13 applied through them and through the bar as shown. When so mounted in a slot they may be swung to positions entirely within the side limits of the bar so as not to interfere with insertion of the bar in a socket.

Each dog 12 is formed, at what will be designated as its outer end, with a head 12h that extends slightly beyond the end surface of the bar to which the slot 11 containing the dogs opens. Each head is formed along its outer edge with an arcuately curved camming surface 12c and the head terminates in a laterally directed, hook-shaped prong 12p. At its opposite, or inner end, each dog terminates in a point 12d and this point forming portion is beveled along its outer edge, as at 15.

When the anchor as shown in FIG. 3 is to be used, the pieces of material to be joined thereby are first prepared with sockets to receive it. For example, if a wooden beam such as that designated by numeral 20 in FIG. 1 is to be supported on piling, posts or wooden columns, such as designated by reference numeral 21, a vertical socket as at 22 in FIG. 2, would be bored downwardly into the upper end surface of each post, to a predetermined depth, to receive the lower end portion of the bar 10, and a like socket would be bored upwardly into the beam perpendicular to its under surface. The paired lower end dogs would then be swung on their mounting pivot pin 13 to positions disposed within the side limits of the anchor bar 10, and the lower end of the bar then inserted into the socket 22 of the post in the manner shown in FIG. 2. Preferably, but not necessarily, a metal disk or washer 25 is first placed against the bottom of the socket. The bar 10 is then driven or otherwise forced downwardly in the socket to cause the lower edge surfaces 12c of the heads 12h to engage the metal disk 25, or lower end surface of the socket and by the action of their camming surfaces to deflect the head ends of the dogs outwardly and cause the prongs 12p to enter the wood as has been shown in FIG. 1 and as indicated in dotted lines in FIG. 2. With this pivoting movement of the paired dogs, their inner ends swing laterally, each in a direction opposite to the outer end movement, and the sharpened side edges 15 of the points 12d are caused to cut into the side wall surfaces of the sockets. When the anchor bar is firmly seated in the socket, the inner and outer end portions of the dogs will be in the positions in which they are shown in dotted lines in FIG. 2, and therefore will anchor the bar against turning in the socket and also against being pulled from it.

With the bar 10 so applied to the column 21 then the beam 20 is applied in such manner that the upper end portion of the anchor bar 10, which extends above the top end surface of the column, will be received in the beam socket which has been bored to a predetermined depth. The beam is then forced down and against the top surface of the post 21 as in Fig. 1, and in doing this the dogs which are applied to the upper end of the anchor bar 10 are caused to cut into and interlock with the sides of socket to effect a holding connection in the same way as previously explained in connection with the lower set.

It may be explained that it may be desirable and practical to assemble and join the parts after placing the anchor in position shown in FIG. 2, by placing the beam in position and then forcing it to position, thus to effect the interlocking of both sets of dogs at the same time.

Anchors of this kind may be made in various sizes for use in articles of furniture and the like, as well as in various other articles of manufacture where the bars may be of small diameter and in various lengths. It is also to be understood that the dogs 12 might be modified in shape to substantial extent without departing from the spirit of the invention.

Such anchors would be desirable for securing rungs of chairs or ladders in place, for holding tenons against loosening and also in heavy construction work such as trestles, bridges and the like.

What I claim as new is:

1. An anchor member for the joining of wooden structural members that have been formed in adjacent faces with sockets; said member comprising a cylindrical bar formed diametrically in its opposite end portions with longitudinal slots opening to its end surfaces; said bar being adapted to have its opposite end portions forced into said socket for the connecting of said members; a pair of anchoring dogs disposed in each of the opposite end slots and normally containing within the sidewall surfaces of the bar, each pair of dogs comprising two flat plates, face to face and pivoted intermediate their ends for turning movement about a common pivot pin, said dogs including head portions at one end projecting beyond the end surface of the bar, the other end of said dogs being pointed and directed toward the base of said slot and said head portions including camming surfaces engageable with the ends of said sockets to effect pivotal turning of the paired dogs in opposite directions, to cause the pointed end portions of each dog to enter and holdingly engage with the sidewall surfaces of the sockets to prevent turning or withdrawal of the bar.

2. In combination, a wooden timber or the like having an elongated socket formed therein and an anchoring member closely fitted in fixed position in said socket, said anchoring member including a bar having a lower end and an upper end and a longitudinally extending radial slot formed therein and opening to said lower end, a pair of holding dogs pivotally mounted in said slot intermediate the ends thereof and intermediate the ends of said dogs, each of said dogs including a pointed upper end portion and a lower end portion, said lower end portions of said dogs normally extending beyond the lower end of said anchor member and including arcuate edge portions which engage with the bottom of said socket whereby the pointed upper end portions of said dogs are caused to project radially from the bar and pierce the sidewalls of said socket incident to pressure exerted on said arcuate edge portions by the bottom of said socket corresponding with the movement of the bar into the socket.

References Cited in the file of this patent
UNITED STATES PATENTS

| | | |
|---|---|---|
| 264,910 | Trabue | Sept. 26, 1882 |
| 476,362 | Breisch | June 7, 1892 |
| 772,515 | Jackman | Oct. 18, 1904 |
| 943,211 | Abrams | Dec. 14, 1909 |
| 1,429,200 | Fotacos | Sept. 12, 1922 |
| 1,612,472 | Scott | Dec. 28, 1926 |
| 2,485,531 | Dzus | Oct. 18, 1949 |
| 2,538,292 | Brown | Jan. 16, 1951 |